United States Patent [19]

Schultz

[11] 4,319,723

[45] Mar. 16, 1982

[54] STABILIZER FOR AN EJECTION SEAT

[75] Inventor: Edwin R. Schultz, Waynesville, Ohio

[73] Assignee: The United States of America as represented by the Secretary of the Air Force, Washington, D.C.

[21] Appl. No.: 111,044

[22] Filed: Jan. 10, 1980

[51] Int. Cl.³ .............................................. B64D 25/10
[52] U.S. Cl. ................................... 244/122 A; 244/141
[58] Field of Search ........ 244/122 R, 122 A, 122 AB, 244/122 AC, 122 AD, 122 AE, 122 AH, 141, 140, 82

[56] References Cited

U.S. PATENT DOCUMENTS

| | | | |
|---|---|---|---|
| 1,087,993 | 2/1914 | Sprater | 244/82 |
| 2,829,850 | 4/1958 | Culver | 244/141 |
| 2,931,598 | 4/1960 | Sanctuary | 244/122 AD |
| 3,042,347 | 7/1962 | Halsey | 244/141 |

FOREIGN PATENT DOCUMENTS 1158537 6/1958 France ............................... 244/140

Primary Examiner—Charles E. Frankfort
Attorney, Agent, or Firm—Donald J. Singer; Richard J. Killoren

[57] ABSTRACT

A yaw stabilization system for an aircraft ejection seat having a vane for sensing the angular offset of the yaw air flow velocity vector and for extending paddles into the air stream in response to the velocity vector offset. The extended paddle is acted upon by the air stream to provide a restoring moment around the center of gravity of the seat and occupant to return the seat to the desired attitude with respect to the air flow velocity vector.

4 Claims, 5 Drawing Figures

STABILIZER FOR AN EJECTION SEAT

RIGHTS OF THE GOVERNMENT

The invention described herein may be manufactured used by or for the Government of the United States for all governmental purposes without the payment of any royalty.

BACKGROUND OF THE INVENTION

This invention relates to an aerodynamic stabilizer for an ejection seat.

The U.S. Pat. Nos. to Culver, 2,829,850; Sanctuary, 2,931,598; McIntyre, 3,554,472; and Hantzsch, 3,592,419, relate to various ejection seat stabilization and control systems.

Ejection seats are inherently unstable about the pitch and yaw axes. These instabilities reduce seat performance during the rocket burn phase of ejection and contribute to limb flail problems.

It is desirable to prevent yaw movements of the ejection seat at the high ejection velocities since any angular offset of the velocity vector will tend to contribute to limb flail problems which cause serious injuries to the crewmembers.

BRIEF SUMMARY OF THE INVENTION

According to this invention, use is made of angular offset of the velocity vector resulting from yaw movements to provide a counterforce on the ejection seat to restore the velocity vector to zero offset. A sensor responsive to velocity vector angular offset is provided which extracts energy from the airstream to position drag paddles in the airstream to provide stabilizing moments on the ejection seat.

IN THE DRAWINGS

DETAILED DESCRIPTION OF THE INVENTION

Figure 1:
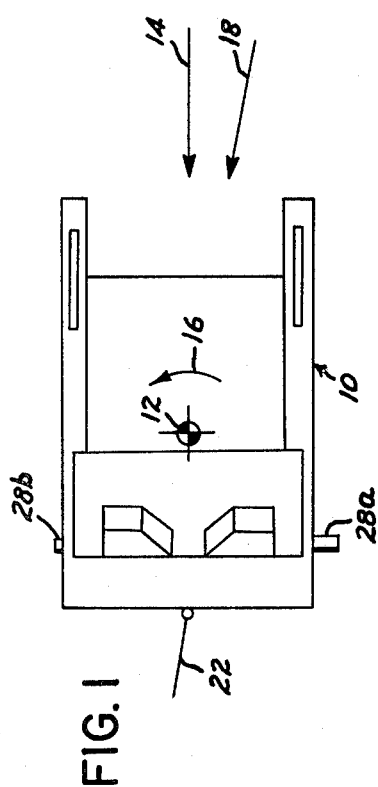
FIG. 1 is a schematic top view of an ejection seat according to the invention.

Reference is now made to FIG. 1 of the drawing which shows an ejection seat 10. The position of the center of gravity of an occupied ejection seat is indicated at 12. Immediately after ejection, before the parachutes have time to become deployed, the seat occupant is subjected to very high flow velocities. It is desirable to keep the flow velocity vector along a line, relative to the ejection seat, as indicated at 14. Ejection seats are inherently unstable about the yaw and pitch axes. Rotation about the yaw axis, such as indicated at 16, will result in an angular offset in flow velocity vector to a relative position as indicated at 18. This will cause a side thrust on the limbs of the seat occupant which may result in limb flail and injury to the occupant.

A sensing vane 22, rotatably supported by bearing mounts 23 on the back of the seat 10, will maintain alignment with the flow velocity vector. Such a vane can be used to position drag paddles 28a or 28b in the air stream to provide a restoring moment to return the velocity vector to the position indicated at 14. The drag paddles, 28a and 28b, ride on rollers and associated mounts 28c and 28d to reduce friction forces generated by paddle air flow loads. The vane 22 is connected to a pinion 24 which engages a rack member 26 secured to the drag paddle member 28. The vertical centerline of paddle member 28 should pass through a line 30, which passes through the center of gravity and would be aligned with the desired flow velocity vector 14, so as not to induce any pitch moments in the ejection seat.

In the operation of the device, immediately after ejection it is desirable to have the yaw flow velocity vector relative to the ejection seat, as indicated at 14, in FIG. 1. Any yaw rotation, such as indicated at 16, will result in a flow velocity vector offset which will move the vane 22. Movement of the vane 22 will rotate pinion 24 to move the rack member 26 and paddle member 28 so as to extend paddle 28a or paddle 28b, depending upon the direction of offset. The airstream acting against the paddle 28a or 28b which is extended the greater distance beyond the ejection seat will result in a yaw turning moment around the center of gravity to restore the ejection seat to the yaw attitude, such as to return the flow velocity vector to the line indicated at 14.

Other means, not shown, may be used to provide pitch axis correction. A similar paddle system could be used for pitch axis correction; however, it would be difficult to use such systems for both pitch and yaw correction without interference of one with the other.

Figure 2:
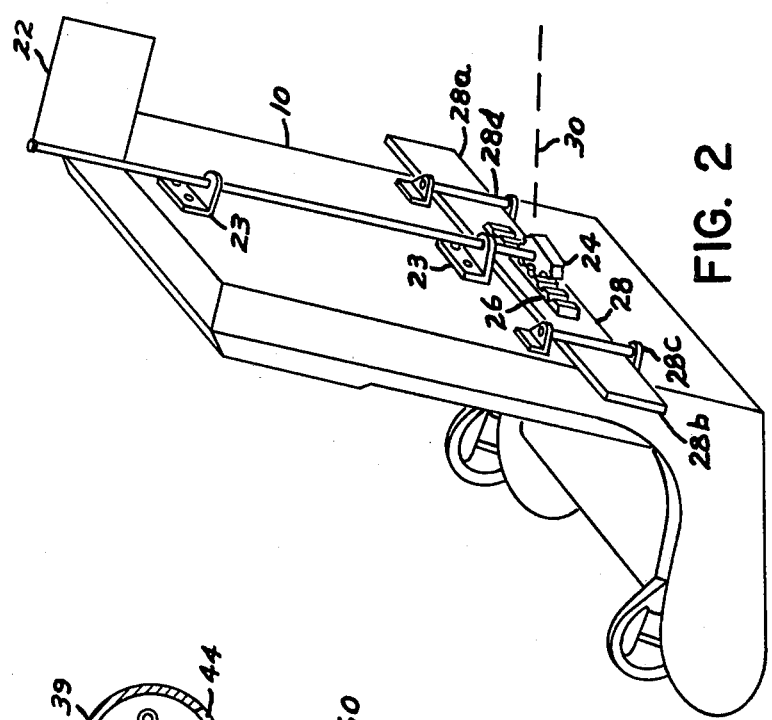
FIG. 2 is a schematic isometric view showing the rear of the device of FIG. 1.
Figure 5:
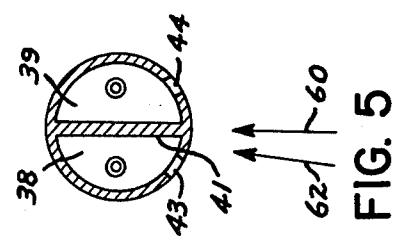
FIG. 5 is a sectional view of the device of FIG. 4 along the line 5—5.
Figure 3:
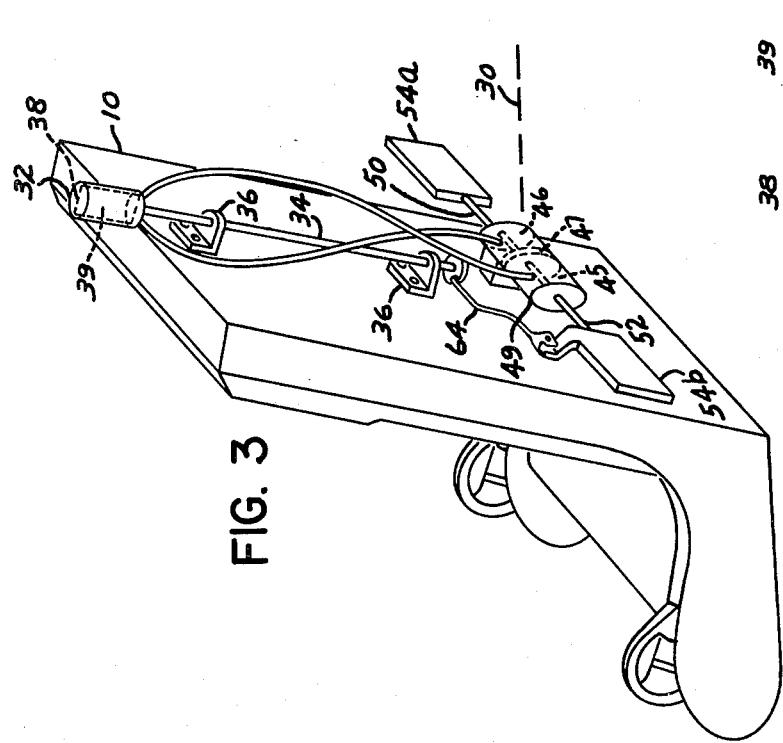
FIG. 3 is a schematic isometric view of a modification of the device of FIGS. 1 and 2.
Figure 4:
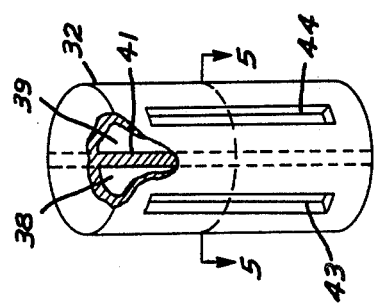
FIG. 4 is an isometric front view of the flow velocity vector offset sensor for the device of FIG. 3.

The paddles can be actuated by means other than a vane such as 22. As shown in FIG. 3, a closed cylinder 32, supported on a rotatable shaft 34, secured to the back of the seat 10 by means of bearing mounts 36, is positioned in the air stream above the seat. The cylinder is divided into two chambers 38 and 39 by means of a divider 41, as shown in FIGS. 4 and 5. Elongated apertures 43 and 44 admit ram air from the air stream. The chambers 38 and 39 are connected to chambers 45 and 46, respectively, on opposite sides of a piston 47 in pneumatic actuator 49. The piston 47 is connected to shafts 50 and 52, which are connected to paddles 54a and 54b. The divider 41 is positioned to be aligned with the desired flow velocity vector 60 when the paddles 54a and 54b extend equal distances into the air stream. With the seat attitude with respect to the air flow velocity vector as indicated at 60 and the paddle device centered, the ram air will have equal effects in chambers 38 and 39 and paddles 54a and 54b will remain equally positioned from line 30. Rotation about the yaw axis, such as indicated at 16 in FIG. 1, will result in an offset of the velocity vector as indicated at 62 in FIG. 5 and the ram air will produce a greater effect in chamber 38 than in chamber 39. This will increase the air pressure in chamber 45 a greater amount than in chamber 46 and will cause piston 47 to move to the right and extend paddle 54a. This movement of paddle 54b causes a feedback linkage 64 to rotate shaft 34 to null out the differential pressure in chambers 45 and 46. This occurs when divider 41 is parallel with vector 62. This action will result in a restoring moment, as in the device of FIG. 2, to restore the ejection yaw attitude which will return the flow velocity vector to the line indicated at 60.

There is thus provided an aerodynamic stabilizing apparatus which senses the air flow velocity vector and extracts energy from the air stream to position paddles attached to the back of the seat to provide a restoring moment to return the ejection seat to the desired attitude with respect to the air stream velocity vector.

I claim:

1. A yaw stabilization system on an aircraft ejection seat, comprising:
   a yaw stabilization paddle device supported on the back of the ejection seat for transverse movement relative to the opposite sides of the seat; and
   means mounted on the back of the seat and extending above the back of the seat into the air stream for sensing the direction of yaw angular offset of the air flow velocity vector relative to the seat upon yaw rotation of the ejection seat and for causing transverse movement of said yaw stabilization paddle device into the air stream in the direction of yaw angular offset, to provide a restoring moment on the ejection seat.

2. The yaw stabilization system as recited in claim 1, wherein said angular offset sensing means includes:
   a vane member extending above said ejection seat into the air stream;
   means supporting the vane member on the back of the ejection seat for rotation about an axis extending vertically and substantially parallel to the back of the ejection seat;
   a pinion member connected to the vane supporting means; and
   a rack member secured to said yaw stabilization paddle device and engaging said pinion member.

3. A yaw stabilization system on an aircraft ejection seat, comprising:
   a yaw stabilization paddle device supported on the back of the ejection seat for transverse movement relative to the opposite sides of the seat;
   a pneumatic cylinder including a piston connected to said yaw stabilization paddle device; and
   means mounted on the back of the seat and extending above the back of the seat into the air stream for sensing the direction of yaw angular offset of the air flow velocity vector with respect to the ejection seat upon yaw rotation of the seat and supplying ram air from the air stream to said pneumatic cylinder to cause transverse movement of the yaw stabilization paddle device into the air stream in the direction of yaw angular offset to provide a restoring moment on the ejection seat.

4. The yaw stabilization system as recited in claim 3, wherein said means for sensing angular offset of the air flow velocity vector and supplying ram air from the air stream to said pneumatic cylinder includes:
   a closed cylindrical sensing device rotatably supported on the back of said ejection seat and extending above the ejection seat into the air stream;
   means in said closed cylindrical sensing device extending in the direction of the air flow velocity vector with respect to the ejection seat for dividing said sensing device into two closed chambers, each chamber having a slot for receiving ram air from the air stream;
   means connected between said closed chambers of said sensing device and opposite sides of said piston in the pneumatic cylinder to communicate ram air thereto for causing transverse movement of the yaw stabilization paddle device into the air stream in the direction of yaw angular offset; and
   feedback means connected to said sensing device and said yaw stabilization paddle device for maintaining the means for dividing the sensing device into two closed chambers, in substantial alignment with the air flow velocity vector.

* * * * *